United States Patent [19]

Kanao

[11] Patent Number: 4,611,636
[45] Date of Patent: Sep. 16, 1986

[54] REINFORCED UNDERGROUND PIPE

[76] Inventor: Shiro Kanao, No. 9-18, Nanpeidai 4-chome, Takatsuki-shi, Osaka, Japan

[21] Appl. No.: 697,081

[22] Filed: Jan. 31, 1985

[30] Foreign Application Priority Data

Oct. 22, 1984 [JP] Japan .................................. 59-221871

[51] Int. Cl.[4] .............................................. F16L 9/12
[52] U.S. Cl. .................................... 138/153; 138/173; 174/68 C
[58] Field of Search ............... 138/121, 122, 173, 150, 138/153; 174/68 C, 102 D, 106 D

[56] References Cited

U.S. PATENT DOCUMENTS

| | | | |
|---|---|---|---|
| 432,059 | 7/1890 | Maschmeyer | 138/150 |
| 1,890,077 | 12/1932 | Elting | 138/173 X |
| 2,968,321 | 1/1961 | Kahn | 138/122 |
| 3,578,777 | 5/1971 | De Gain | 138/173 X |
| 3,605,817 | 9/1971 | Bauman et al. | 138/121 |
| 3,738,394 | 6/1973 | Westerbarkey | 138/173 X |
| 3,747,352 | 7/1973 | Maroschak | 138/173 X |
| 3,785,290 | 1/1974 | Castor et al. | 138/121 X |
| 4,182,580 | 1/1980 | Hieda et al. | 138/173 X |
| 4,303,104 | 12/1981 | Hegler et al. | 138/173 X |
| 4,421,437 | 12/1983 | Langer | 138/173 X |
| 4,509,447 | 4/1985 | Smith, Sr. | 138/150 X |

FOREIGN PATENT DOCUMENTS

| | | | |
|---|---|---|---|
| 198118 | 11/1957 | Austria | 138/121 |
| 938075 | 1/1956 | Fed. Rep. of Germany | 174/102 D |
| 1299107 | 7/1969 | Fed. Rep. of Germany | 138/122 |
| 3102827 | 8/1982 | Fed. Rep. of Germany | 138/122 |
| 729695 | 5/1955 | United Kingdom | 174/102 D |

*Primary Examiner*—Stephen Marcus
*Assistant Examiner*—Mark Thronson
*Attorney, Agent, or Firm*—Sughrue, Mion, Zinn, Macpeak & Seas

[57] ABSTRACT

A reinforced underground pipe made of a synthetic resin having an improved strength and reduced resin requirement. The reinforcement of the pipe is constituted by a helical rib formed on the outer surface of the main body of the pipe. At least side wall portions of the rib are corrugated. The rib may be U shaped or have a semicircular cross section. The corrugations may be rectangular, sinusoidal or triangular.

8 Claims, 11 Drawing Figures

REINFORCED UNDERGROUND PIPE

BACKGROUND OF THE INVENTION

The present invention relates to an underground pipe, specifically, an underground pipe made of a synthetic resin material and which is intended for use as a water main pipe, sewer pipe, sheath for protecting electrical cables, or the like.

A prior art pipe of the same general type to which the present invention pertains has been disclosed by the present applicant in Japanese Laid-Open Utility Model applications Nos. 44582/83 and 44583/83. In the former application, there is disclosed a pipe having a reinforcement constituted by an integral helical U-shaped rib. The open side of the rib is closed with a band-like member so that the inner surface of the pipe is continuous. In the latter application, the reinforcement is constituted by a helical U-shaped rib fused to the outer surface of a continuous pipe.

Both types of pipe have a generally high strength, and are advantageous in that respect. Moreover, these pipes have a good pressure-withstanding ability and are light in weight and easy to handle. On the other hand, in both cases, the load is concentrated in wall portions opposite the reinforcement, making it necessary to increase the wall thickness in these areas. This calls for an increase in the amount of resin material needed to form the pipes and makes them heavier than is desired.

SUMMARY OF THE INVENTION

Accordingly, it is an object of the present invention to provide a reinforced underground pipe in which the disadvantages mentioned above have been eliminated.

This as well as other objects of the present invention have been met by providing a reinforced underground pipe in which the reinforcement is constituted by a generally U-shaped rib formed helically on the outer surface of the pipe body with at least the side wall portions of the reinforcing rib being corrugated.

DESCRIPTION OF THE PREFERRED EMBODIMENTS

Figure 1:
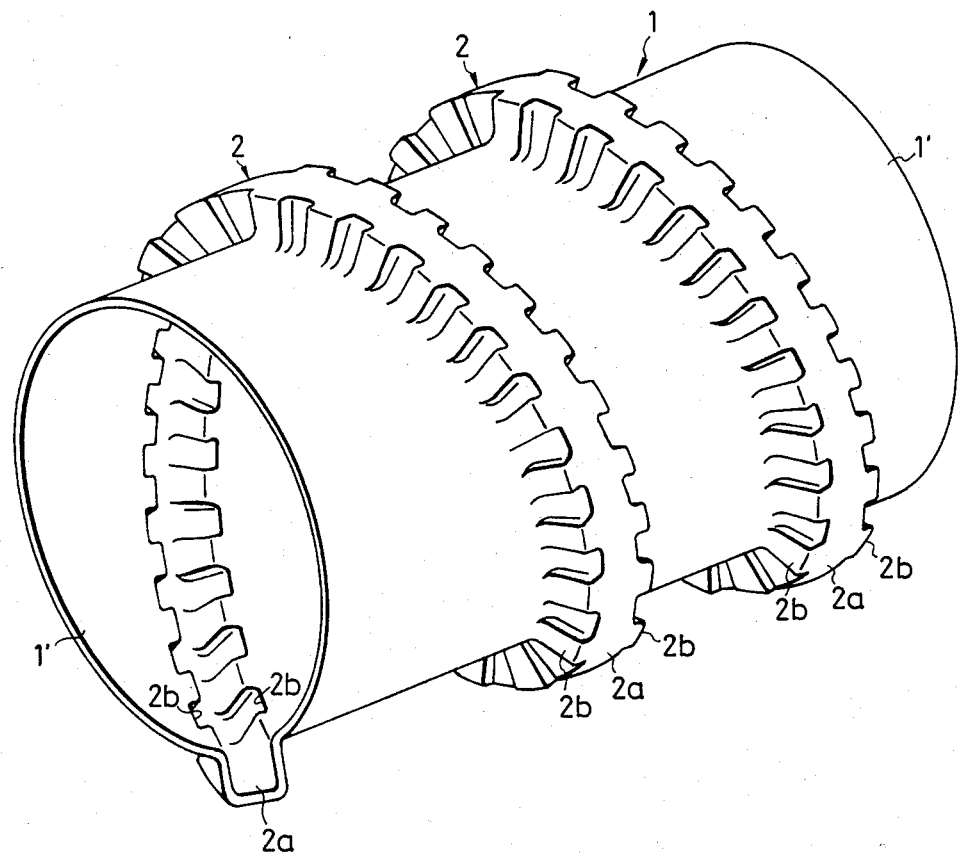
FIG. 1 is a cut-away perspective view showing a first embodiment of an underground pipe of the invention.
Figure 2:
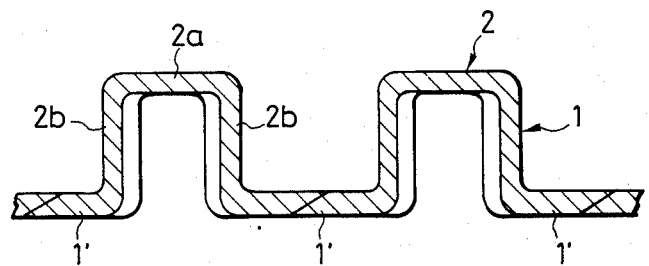
FIG. 2 is an enlarged cross-sectional view showing a portion of the pipe of FIG. 1.
Figure 3:
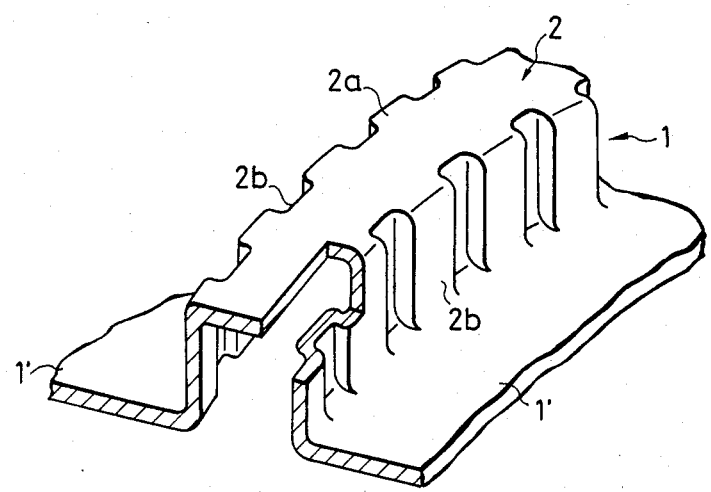
FIG. 3 is a partially cut-away perspective view showing a portion of the pipe of FIG. 1.
Figure 4:
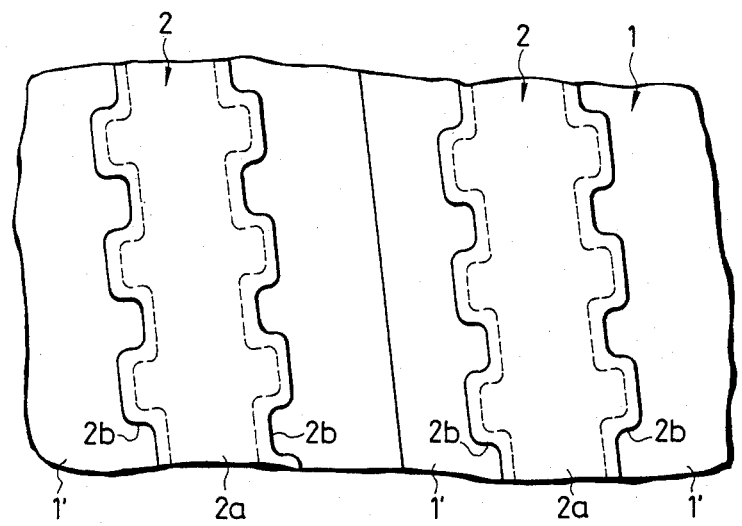
FIG. 4 is a plan view showing a portion of the pipe of FIG. 1.

Referring to the drawings, preferred embodiments of the invention will be described hereunder.

With reference to FIGS. 1 through 4, a first preferred embodiment will be described. In this embodiment, the reinforcement takes the form of a helical generally U-shaped rib 2 formed integrally with a main wall 1' of a pipe body 1. The side walls 2b and 2c of the rib 2 are corrugated, while the top wall 2a of the rib 2 is flat.

Figure 5:
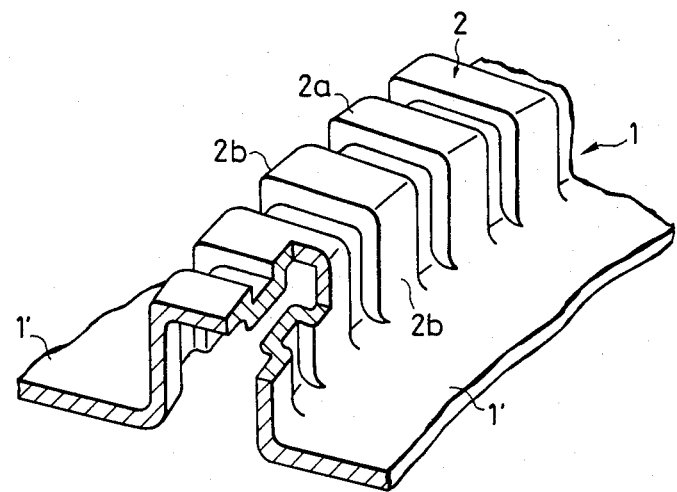
FIG. 5 is a view similar to FIG. 3 but showing a second embodiment of an underground pipe of the invention.

In an emboidment illustrated in FIG. 5, the top wall 2a is corrugated as well, having corrugations merging with those of the side walls 2b and 2c.

Figure 6:
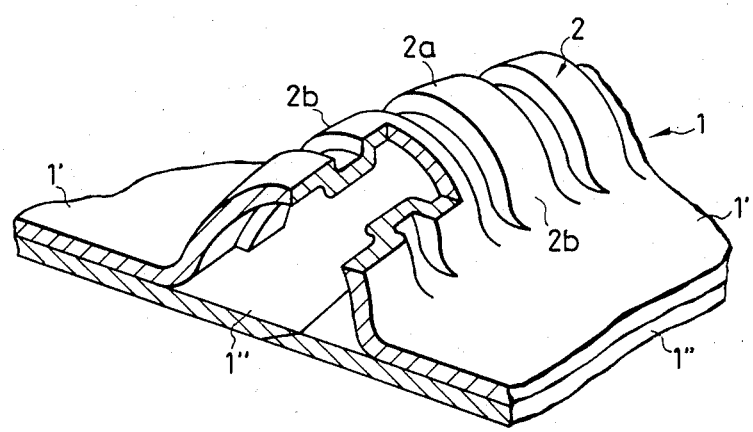
FIG. 6 is a view similar to FIG. 3 but showing a third embodiment of an underground pipe of the invention.

In FIG. 6, an embodiment is shown in which the rib 2 is semicircular in cross section and in which a two-layered structure is employed wherein the reinforcing rib forms a part of a band which is wound around a solid inner layer 1" of the pipe, covering the entire outer surface of the inner layer 1".

Figure 7:
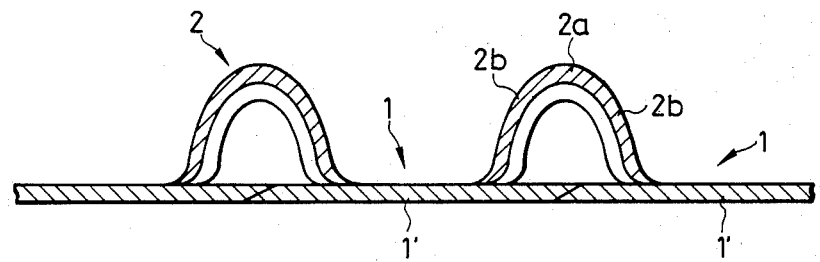
FIGS. 7 through 9 are cross-sectional views showing portions of other embodiments of underground pipes constructed in accordance with the invention.

The embodiment of FIG. 7 is similar to that of FIG. 6, except that the rib is wound directly onto the outer surface of the pipe body 1 without the use of the other band portions employed in the embodiment of FIG. 6.

Figure 8:
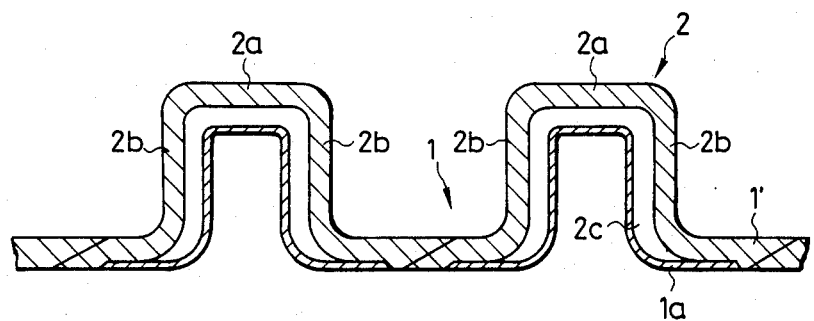
Figure 9:
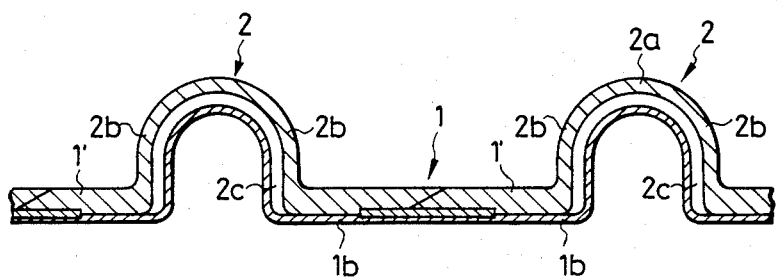

In the embodiments of FIGS. 8 and 9, a relatively thin inner wall 1a (FIG. 8) or 1b (FIG. 9) is provided which generally conforms to the shape of the interior of the reinforcing rib 2 but which leaves a gap 2c therebetween.

Figure 10:
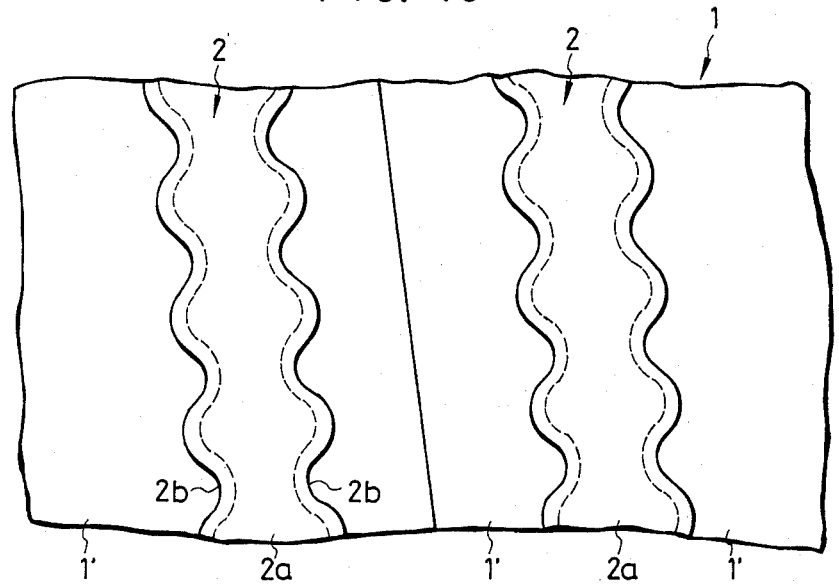
FIGS. 10 and 11 are top views of still further embodiments of underground pipes of the invention.
Figure 11:
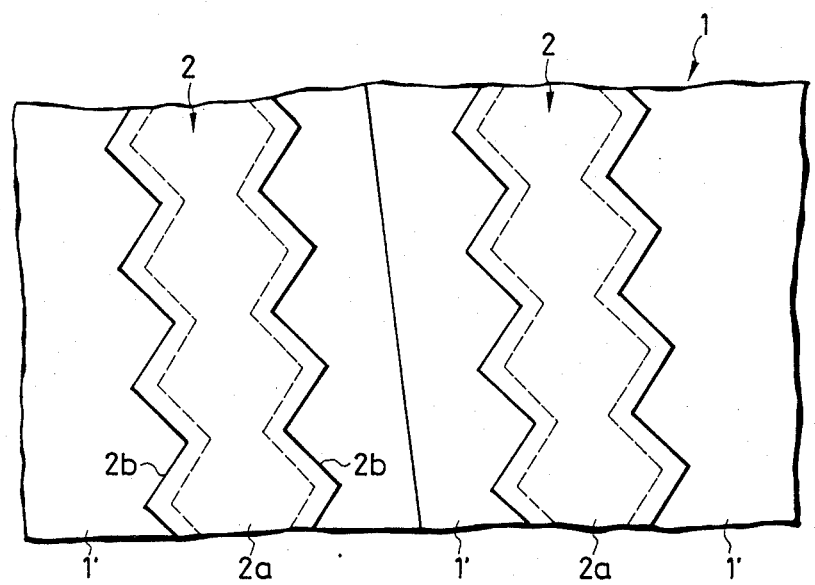

FIGS. 10 and 11 illustrate alternate shapes which may be employed for the corrugated walls of the reinforcement. That is, rather than the rectangular corrugations employed in the embodiments described above, the embodiment of FIG. 10 has a wavy approximately sinusoidal shape, while the embodiment of FIG. 11 has a triangular shape.

In any of the above-described embodiments, the pitch of the corrugations of the reinforcements can be determined in accordance with the conditions under which the pipe is to be used.

In all of the embodiments of the invention described above, a reinforcing rib is provided which has at least side wall portions corrugated. Accordingly, there is provided an underground pipe which is exceptionally strong in both longitudinal and radial directions. It is not necessary to make any wall, including both the walls of the reinforcing rib and the walls of the main body of the pipe, any thicker than other walls. Thus, the pipe of the invention is advantageous in that less resin material is required than in previous constructions and the pipe is lighter. The pipe of the invention is also easy to handle and install.

This completes the description of the preferred embodiments of the invention. Although preferred embodiments have been described, it is believed that numerous modifications and alterations thereto would be apparent to one of ordinary skill in the art without departing from the spirit and scope of the present invention.

I claim:

1. A reinforced underground pipe, comprising; a tubular body made of a synthetic resin, a helical reinforcing rib formed on an outer surface of said tubular body, said rib having a pair of opposed side walls, and at least both said side walls being regularly and continuously corrugated along their entire lengths.

2. The underground pipe of claim 1, wherein said reinforcing rib is generally U shaped and has a top wall which is continuously flat.

3. The underground pipe of claim 1, wherein said reinforcing rib is generally U shaped and further includes a top wall portion which is regularly and continuously corrugated along its entire length.

4. The underground pipe of claim 1, wherein said reinforcing rib has a continuously semicircular cross section.

5. The underground pipe of claim 1, further comprising an inner wall of lesser thickness than a main wall portion of said tubular body, said inner wall generally conforming to the shape of said rib but with a gap of predetermined width therebetween.

6. The underground pipe of claim 1, wherein said rib has rectangular corrugations.

7. The underground pipe of claim 1, wherein said rib has wavy approximately sinusoidal corrugations.

8. The underground pipe of claim 1, wherein said rib has triangular corrugations.

* * * * *